May 8, 1956     J. F. HECK, JR     2,744,815
UNDERGROUND TRAP FOR LEAKS IN GAS PIPES
Filed May 12, 1953
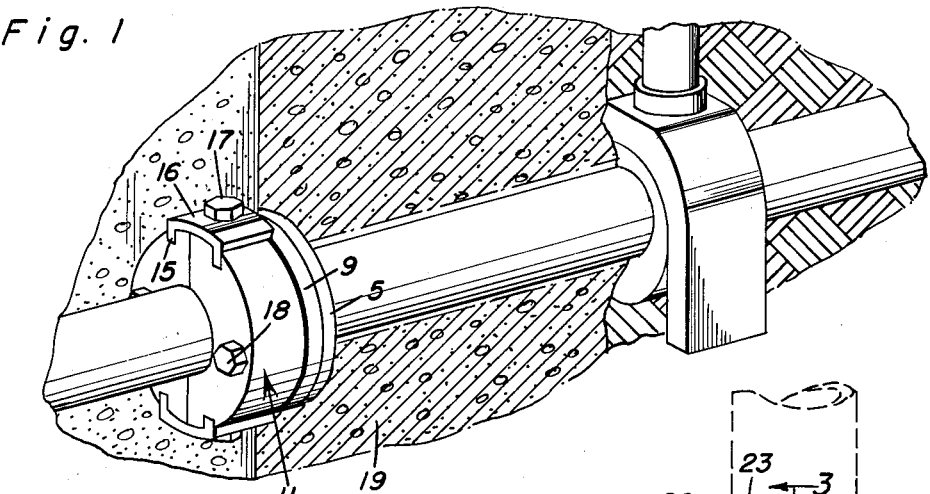
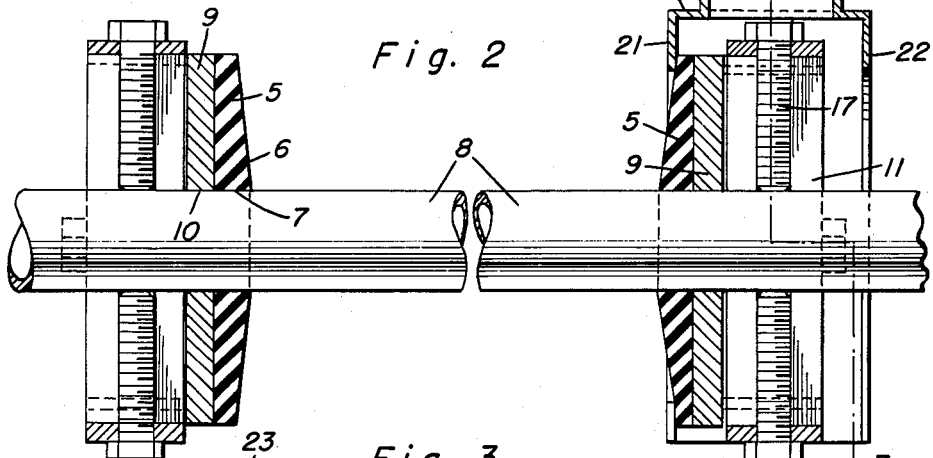
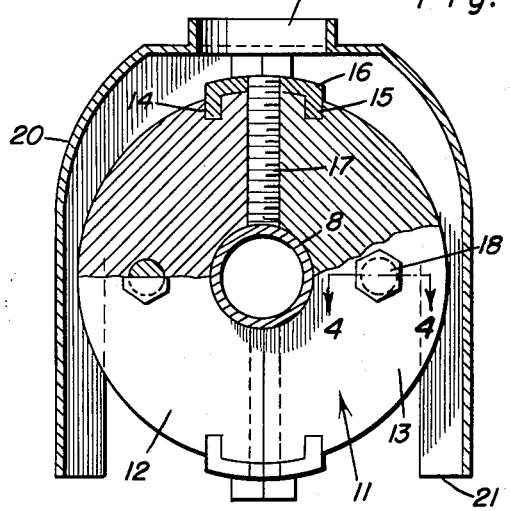
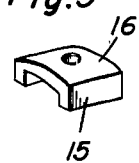
John Francis Heck, Jr.
INVENTOR.

United States Patent Office 2,744,815
Patented May 8, 1956

2,744,815

UNDERGROUND TRAP FOR LEAKS IN GAS PIPES

John Francis Heck, Jr., Natrona Heights, Pa., assignor to New Allegheny Manufacturing Company, Tarentum, Pa., a corporation of Pennsylvania Application May 12, 1953, Serial No. 354,539

1 Claim. (Cl. 48—193)

The present invention relates to new and useful improvements in traps for gas pipes leading into a building to eliminate seepage from leaks entering the foundation of the building along the pipe.

An important object of the invention is to entrap leaking gas as it approaches a building along the outside of an underground service line and to discharge such gas above the surface of the ground.

Another object is to provide a seal for the gas pipe which may be placed at both the outside and inside of a wall through which the pipe enters to exclude gas entering a building, and also to provide a trap for the external seal having a vent leading therefrom to the surface of the ground.

A further object is to provide a device of this character of simple and practical construction, which is efficient and reliable in operation relatively inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view;

Figure 2 is a longitudinal sectional view;

Figure 3 is an enlarged transverse sectional view taken on a line 3—3 of Figure 2.

Figure 4 is a fragmentary sectional view taken on a line 4—4 of Figure 3; and

Figure 5 is a perspective view of the connector for the anchoring disk.

Referring now to the drawing in detail, wherein for the purpose of illustration I have disclosed a preferred embodiment of my invention, the numeral 5 designates a rubber sealing disk having a convexed surface 6 and a central opening 7 adapted for closely fitting on a gas pipe 8. A metal backing disk 9 is also formed with a central opening 10 for mounting on the pipe against the opposite surface of disk 5.

Also mounted on pipe 8 against metal disk 9 is a sectional metal anchoring disk 11 composed of a pair of semi-disk sections 12 and 13 having notches 14 in the periphery thereof adjacent their meeting edges and in which the legs 15 of a U-shaped connector 16 are received. The meeting edges of the disk sections are threaded to receive a set screw or bolt 17 passing through the connector to secure the connector in locking engagement with the disk 11 and also to bear against the pipe 8 to anchor the sectional disk thereto.

A pressure screw or bolt 18 is threaded through each section 12 and 13 of disk 11 to bear against backing disk 9.

A pair of the assembled sealing devices, composed of sealing disk 5, backing disk 9 and anchoring disk 11 are mounted on the pipe at the inner and outer sides of a wall 19 of a building foundation and through the gas pipe extends and pressure screws 18 are adjusted to compress the convexed surface 6 of sealing disk 5 against the wall to seal the disk about the pipe and against the wall to prevent gas working along the pipe to the interior of the building.

A U-shaped trap 20 is formed with an internal channel 21 and is inverted to fit over the external sealing device, and with the inner flange 21 of the channel fitting against the convexed surface of the rubber sealing disk 5 and the outer flange 22 of the channel spaced outwardly from sectional anchoring disk 11, as shown in Figure 3, to provide a passage for the gas, as it approaches the building wall. The top of trap 20 is formed with a neck 23 to which a vent pipe (not shown) is atached for conveying the gas to the surface of the ground to the outside of the building.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

A seal for pipes comprising a compressible sealing disk surrounding the pipe in compressing abutting engagement at its major portion with a structure through which the pipe passes, an annular member composed of a pair of semicircular abutting sections having transverse notches in the periphery of each section adjacent their abutting edges, a U-shaped connector having its leg portions engaged in the notches in bridging relation with the abutting edges of the sections, a bolt pasisng through the connector and threaded radially in the abuting edges of said sections and with the inner end of the bolt abuting the pipe to anchor the annular member thereto, an inverted U-shaped channel member straddling the disk and annular member and having a flange positioned behind the disk adjacent the periphery of the latter, said U-shaped member having a vent pipe leading upwardly therefrom, a backing plate between the disk and the annular member, and pressure screws carried by each section of said member and engaging the backing plate to compress the disk adjacent the peripheral portion of the latter against the flange of the U-shaped member to clamp the latter to the structure in a fixed position on the pipe and to compress the remaining portion of the disk against the structure.

References Cited in the file of this patent

UNITED STATES PATENTS

| | | |
|---|---|---|
| 1,081,273 | McLellan | Dec. 9, 1913 |
| 1,251,539 | Kiser | Jan. 1, 1918 |
| 2,108,840 | Anthony | Feb. 22, 1938 |
| 2,171,935 | Korn | Sept. 5, 1939 |
| 2,473,150 | Kimbrough | June 14, 1949 |